United States Patent [19]

Verbanac

[11] 4,060,506

[45] Nov. 29, 1977

[54] STARCH ACRYLAMIDES AND THE METHOD FOR PREPARING THE SAME

[75] Inventor: Frank Verbanac, Decatur, Ill.

[73] Assignee: A. E. Staley Manufacturing Company, Decatur, Ill.

[21] Appl. No.: 680,646

[22] Filed: Apr. 27, 1976

[51] Int. Cl.$^2$ .............................................. C08L 3/00
[52] U.S. Cl. .......................... 260/17.4 GC; 260/17.3; 260/17.4 ST; 260/17.4 UC; 536/50; 536/111
[58] Field of Search ....... 260/17.3, 17.4 ST, 17.4 GC, 260/17.4 UC; 536/50, 111

[56] References Cited

U.S. PATENT DOCUMENTS

| | | | |
|---|---|---|---|
| 2,668,156 | 2/1954 | Caldwell et al. | 260/17.4 |
| 2,928,827 | 3/1960 | Paschall | 536/50 |
| 3,033,852 | 5/1962 | Paschall | 536/50 |
| 3,135,738 | 6/1964 | Cushing | 536/50 |

FOREIGN PATENT DOCUMENTS

| | | | |
|---|---|---|---|
| 879,849 | 10/1961 | United Kingdom | 536/50 |
| 1,413,301 | 11/1975 | United Kingdom | 536/50 |

*Primary Examiner*—Edward M. Woodberry
*Attorney, Agent, or Firm*—M. Paul Hendrickson; Charles J. Meyerson

[57] ABSTRACT

The invention relates to starch acrylamides containing polymerizable pendant acrylamide groups. The hydrophilic or hydrophobic properties of the starch can be altered or modified by the acrylamide groups or the type of starch chain. The starch acrylamides can be homopolymerized or copolymerized with other ethylenically unsaturated monomers as well as other crosslinking reagents to provide water-resistant, clear, flexible coatings or shaped articles. The hydrophilic starch acrylamide hydrolyzates herein readily disperse into water at a high solids level to provide low-viscosity pastes which may be used as a vehicle to prepare flexible, water-insoluble starch-based coatings. The starch acrylamides may be prepared by etherifying a starch with N-methylol acrylamides in the presence of an acid catalyst and a polymerization inhibitor.

41 Claims, No Drawings

STARCH ACRYLAMIDES AND THE METHOD FOR PREPARING THE SAME

BACKGROUND OF THE INVENTION

Modified and unmodified starch products are extensively used for a variety of non-food and industrial applications. They have, traditionally, been used to size or finish textiles and papers, as adhesives (e.g., corrugated and laminated paper boards, remoistening gums, wallpapers, etc.), flocculants, binders (e.g., foundry core binders), fabric printing aides, thickeners and many other divergent non-food and industrial applications.

In the coating and shaped article manufacture, the trade presently relies upon synthetic polymeric materials which are primarily produced from petrochemical raw materials. Petrochemicals are a depletable natural resource. Within recent years, world-wide demand for petroleum-based products has adversely affected the cost and availability of synthetic polymers. Starches are readily available and replenishable with each crop year. Potential starch product usage would substantially increase if it were possible to alter or correct certain inherent defects which have heretofore rendered starch products unsuitable for coating and/or shaped article applications.

Starches are inherently unstable against physical, chemical, bacterial and enzymatic degradation. Starches vary in amylopectin and amylose content. Waxy starches consist essentially of amylopectin with only trace amounts of amylose. Corn starch and other conventional starches such as tapioca, potato and wheat typically contain 16–24% amylose (dry solids weight basis) with the balance thereof being amylopectin. Amylose fractions are comprised almost exclusively of amylose while certain high amylose hybrid corn starches have an amylose content of about 40–70%.

The starch amylose content affects the film-forming, water-dispersibility and water-resistant properties of starch. Low-amylose starches are more easily convertible into aqueous pastes than high-amylose starches. Low-amylose starches are unacceptable as stable or permanent coatings because of their high water-sensitivity (e.g., readily swell and disperse into water). High-amylose starches are difficult to disperse and maintain as a uniform dispersion in aqueous systems (e.g., generally require 230° F+ temperatures under superatmospheric pressure). Upon cooling (e.g., 200° F. or less), the high-amylose starches readily retrograde into non-adhesive and water-insoluble starch particles. Unlike low-amylose starches, articles made or coated with high-amylose starches possess relatively good water-insensitivity and structural properties.

Considerable research has been expended towards the development of new techniques which would enable the art to use high-amylose, starch-based products as a synthetic polymer replacement. Representative thereof are U.S. Pat. Nos. 2,608,723 by Wolff et al.; 2,902,336 by Hiemstra et al.; 2,729,565 by O'Brian et al.; 2,973,243 by Kudera and 3,030,667 by Kunz; these patents basically disclose methods for preparing high-amylose shaped objects or coatings via organic solvent casting techniques. Shaped extrudates prepared by combining water, an organic plasticizer and high-amylose starches by extruding at elevated temperatures are reported in Canadian Patent No. 829,207. Notwithstanding these research efforts, high-amylose starches are still generally regarded as commercially unfit for coating and shaped object applications. Such processes generally involve physical manipulation of the high-amylose starch without altering or modifying the inherent compositional defects of the starch molecule. Moreover, the manipulative steps as well as their incompatibility with conventional coating and shaped article technology severely limit their adaption to commercial manufacturing processes.

At one time allyl starches appeared potentially useful as starch-based coatings (e.g., see J. P. Radley, Starch and Its Derivatives, 4th Ed., 1968). Unfortunately, the allyl starch coating systems have been plagued with difficulties such as non-homogenity, brittleness, inflexibility, poor water-resistance and limited solubility in organo solvent systems (e.g., see Polymerization Studies with Allyl Starch, Journal of Applied Polymer Science, Vol. 7, pages 1403–1410, 1963 by Wilham et al.). Hydrophobic, photopolymerizable N-methylol-polyol polymers have also been disclosed by Rosenkranz et al. in U.S. Pat. No. 3,936,428.

OBJECTS

An object of this invention is to provide novel starch products which contain reactive, pendant ethylenic unsaturation.

Another object of the invention is to provide a method of preparing novel starch products which contain pendant ethylenic unsaturation.

A further object of the invention is to provide a starch product which is adapted for use as a polymerizable or cross-linkable starch reactant.

A still further object of the invention is to provide and prepare starch polymerizates.

An additional object is to provide a novel starch product having utility as a synthetic polymer replacement.

DESCRIPTION OF THE INVENTION

This invention relates to starch acrylamides, the preparation thereof, the polymerization of starch acrylamides and starch acrylamide polymerizates.

According to the present invention there is provided starch acrylamide generally characterized by their pendant and terminal:

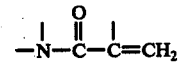

radicals which may, if desired, be further converted to useful products by conventional ethylenically unsaturated derivatization processes, polymerized with itself or with other ethylenically unsaturated monomers and polymers, cross-linked by itself or with other conventional cross-linking agents, etc. The acrylamide groups of the present starches are capable of undergoing more homogeneous and controllable polymerization than conventional allyl starches. The high degree of reactivity of the acrylamide moiety makes these novel starch products particularly suitable for use in coating applications. The hydrophobicity or hydrophilicity of the starch acrylamides may be suitably regulated by the composition of the starch chain or acrylamide substituents. Water-dispersible acrylamide starches may be obtained by derivativing a hydrophilic starch chain with acrylamide groups which retain the over-all hydrophilic character thereof. Conversely, hydrophobic starch acrylamides also may be prepared by derivatizing a starch with a hydrophobic acrylamide or by reacting an acrylamide with a hydrophobic derivatized starch (e.g., cyanoethyl starch). Depending upon the desired end use, the degree of substitution (D.S.) of the appendant acrylamide groups in the starch may vary considerably, such as an average of one appendant group for each 2000 starch glucose units (i.e., 0.0005 D.S.) to a starch having an acrylamide D.S. of 2 or higher (i.e., an average of two or more acrylamide substituents per starch glucose unit).

Illustrative polymerizable starch acrylamides may be represented by the structural Formula I;

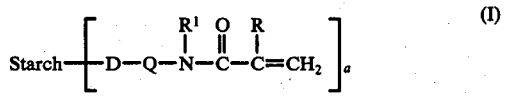 (I)

wherein starch represents a starch chain, $R^1$ is a member selected from the group consisting of hydrogen and a mono-organo group joined directly to the nitrogen atom by a monovalent bond, R represents a member selected from the group consisting of hydrogen and mono-organo group linked to alpha carbon atom of the ethylenically unsaturated group of the acrylamide moiety by a monovalent linkage, Q represents an organo group which divalently joins the D group with the acrylamide group; D is a member selected from the group consisting of sulfur and oxygen linking said Q group to the starch chain and "a" represents the number of acrylamide substituents per anhydroglucose unit of said starch molecule (frequently referred to in the art as degree of substitution or D.S.).

In Formula I, Q may be any divalent organo group which joins the acrylamide radical to the starch chain (e.g., linked to D and acrylamide nitrogen atoms via carbon linkages). The starch oxygen or sulfur atoms and acrylamide nitrogen atom may be directly linked together by a single carbon atom or an organo group comprised of a plurality of carbon atoms with the starch D and

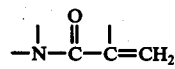

groups of the acrylamide starch being divalently linked by different Q carbon atoms. The —Q— group may be comprised of substituted or unsubstituted straight or branched aliphatic groups (e.g., alkylene), substituted or unsubstituted arylene group (e.g., naphthalene, phenylene, etc.) as well as divalent organo groups which contain carbon to non-carbon atom linkages (e.g., organo ethers and thioethers, sulfonyl, N-methylene substituted secondary and tertiary amines such as a -CH$_2$-N(H)-Q- radical. The Q group linking chain may contain carbonyl, carbonylhydroxy, thiocarbonyl, etc. groups as well as monovalent substituents such as hydroxy, halo, (e.g., Br., F, Cl and I), alkyl, aryl, hydroxyalkyl, hydroxyaryl, alkoxy, aryloxy, carboxyalkyl, carboxyaryl, amine substituents, combinations thereof and the like. Advantageously the divalent Q organo group contains less than 10 carbon atoms and preferably no more than 7 carbon atoms.

In Formula I, R and $R^1$ may be members selected from the group consisting of mono-organo and hydrogen substituents. The R and $R^1$ mono-organo group may contain an ester, ether, carboxylic, organo acid, alcohol, hydrocarbyl (e.g., alkyl, aryl, phenyl, etc.) groups as well as divalent organo groups containing non-carbon atom to carbon chain linkages (e.g., such as oxy, sulfonyl, thio, carbonyl groups, etc. as mentioned above with respect to Q). Advantageously R is either H or a substituted or unsubstituted mono-organo group containing less than 8 carbon atoms such as a lower alkyl or phenyl group. Illustrative substituted mono-organo groups are halo substituted alkyl and phenyl, alkoxy, aryl, phenoxy, phenol and alkanol and correspondingly thiol, alkanoic, tolyl, benzoyl, carboxy, sulfoalkyl, sulfophenyl groups, combinations thereof and the like. In the preferred embodiments of this invention, R and $R^1$ are a member selected from the group consisting of either hydrogen or a 1–5 carbon alkyl (preferably methyl) and "a" has a value of at least 0.001.

In the preferred embodiments of this invention, there are provided starch acrylamides represented by the formula:

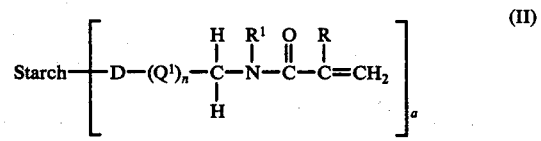 (II)

D is a member as defined above (preferably oxy), $Q^1$ represents a divalent organo group such as Q as defined above, "a" represents the degree of substitution, R and $R^1$ are monovalent groups as defined herein and "n" is an integer of 0 to 1.

The starch acrylamides depicted by Formula II may be prepared by either reacting a starch or starch derivative containing the appropriate —$Q^1$— reactive moiety (if present) with the appropriate acrylamide reactant. Starch acrylamides which do not contain the —$Q^1$— moiety (i.e., n is 0) are typically prepared by reacting the starch with the appropriate N-hydroxy methylacrylamide reagent. Starch acrylamides which contain the —$Q^1$— moiety are typically prepared by initially derivatizing the starch so that it contains a hydrogen atom active $Q^1$ substituent and then reacting the $Q^1$ derivatized starch with an acrylamide which contains an N-methylol group (e.g., etherification). For example, etherification of a hydroxyalkylated starch such as hydroxypropyl starch ether or its corresponding polypropylene oxide ether with N-methylol acrylamide provides a starch acrylamide having a $Q^1$ moiety which may be represented by the formula -(CH$_2$-C(CH$_3$)H-O)$_{\overline{n_1}}$(CH$_2$C(CH$_3$)H-O- wherein $n_1$ represents the number of repeating propylene oxide units, (e.g., for hydroxypropyl starch ether, $n_1$ would be zero with $Q^1$ being -CH(CH$_3$)CH$_2$O-). The $Q^1$ moiety for the hydroxyethyl ether and its corresponding polyethylene oxides as well as other unbranched polyalkylene oxide starch ethers may be depicted by the formula -(CH$_2$)$_{\overline{n_1}}$O)$_{\overline{n_2}}$(CH$_2$)$_{\overline{n_1}}$O wherein $n_1$ is an integer of at least 2 and $n_2$ represents the number of repeating starch alkylene oxide units (e.g., for hydroxyethyl starch ether $n_2$ would be zero and $n_1$ would equal two). Through appropriate selection of starch derivatives containing different $Q^1$ substituents containing a reactive hydrogen atom, starch acrylamides containing a variety of different $Q^1$ linking groups can be prepared via the N-methylol acrylamide reaction route.

The starch chain depicted in Formulas I and II represent unmodified or modified starches obtained from a variety of sources such as cereal, leguminous, tuber starches, etc. Illustrative starch sources include tapioca, corn, high-amylose starches, (e.g., corn, pea, etc.), sweet potato, waxy maize, canna, arrowroot, wheat, sorghum, waxy sorghum, waxy rice, soya, rice, pea, amylopectin fractions, amylose fractions, combinations thereof and the like. Typically modified starches include esters, ethers, inhibited or cross-linked, cationic, non-ionic and anionic starch derivatives, thinned starch hydrolyzates such as dextrins and maltodextrins (e.g., of a D.E. less than about 20), pregelled starches, mixtures thereof and the like. The chemically modified starch chains are particularly useful when it is desired to further modify or impart further functionality to the starch acrylamide. A more uniform product and higher level of substitution can be achieved with non-birefringent starch reactants (e.g., non-granular or gelatinized starch). These non-birefringent starch reactants may suitably be prepared by conventional thinning, pregelling, chemical derivatization techniques, etc.

Illustrative starch acrylamides depicted in Formula II may be prepared by reacting N-methylol acrylamides with starch in the presence of an acid or acid generating catalyst and a polymerization inhibitor by the following etherification equation III:

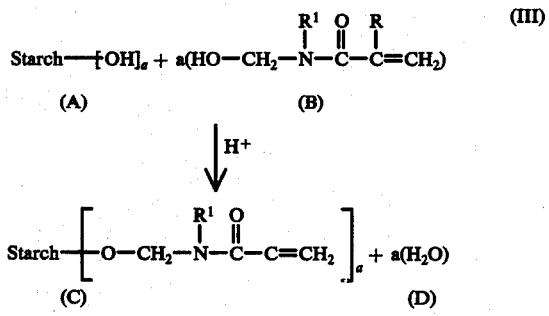

wherein -(OH)$_a$ in reactant A represents those reactive starch hydroxyl groups which are etherified with the N-methylol acrylamide reactant (B), R and R$^1$ are mono-organo or hydrogen groups such as defined herein, "a" in reactant B represents the moles of N-methylol acrylamide reacted with the starch to yield starch acrylamide (C) which contains an acrylamide derivatization level of "a", and H+ represents an acid or acid generating etherifying catalyst. The above N-methylol acrylamide reaction III may also be used to prepare a starch acrylamide reaction product (C) wherein Q as illustrated in Formula I contains an alkylene oxy or arylene oxy group by reacting the corresponding hydroxyaryl or hydroxyalkyl starch ethers (e.g., hydroxypropyl and hydroxyethyl starch ethers) and N-methylol acrylamide wherein R$^1$ and R groups are as defined. Substituted acrylamides which contain a reactive N-methylol group linked to the acrylamide nitrogen atoms by intervening divalent Q organo groups and starches containing cationic and anionic or ionic acrylamide substituents may also be prepared by etherifying a starch with the appropriate N-methylol acrylamide (e.g., sodium-2-N-methylol acrylamido-2-methylpropanesulfonate, a N-methylol acrylamide quaternary ammonium halide such as 3(N-methylol acrylamido)-3-methyl butyl trimethyl ammonium chloride, etc.).

The R, R$^1$ and Q groups and the extent of derivatization therewith (i.e., "a") have a pronounced effect upon the character and functional attributes of the acrylamide reaction product. Representative R$^1$ substituents include hydrogen, N-arylol; the N-alkylamines and N-arylamines; N-organo cationic, anion or ionic substituents; such as N-methyl-; N-ethyl-; N-isopropyl-; N-n-butyl-; N-isobutyl-; N-n-dodecyl-; N-n-octadecyl-; N-cyclohexyl-; N-phenyl-; N-(2-hydroxy-1,1-dimethylpropyl)-; N-p-hydroxybenzyl-; N-(3-hydroxybutyl)-; N-(4-hydroxy-3,5-dimethylbenzyl)-; N-(3-hydroxy-1,1-dimethylbutyl)-; N-(2-hydroxy-1,1-dimethylethyl)-; N-(2-hydroxyethyl)-; N-(5-hydroxy-1-naphthyl)-; combinations thereof and the like. Similar to R$^1$, the R group may therein bear monovalent organo or hydrogen substituents. Illustrative acrylamide reactants include N-methylol and N-methylthio acrylamides such as N-(hydroxymethyl) acrylamide; N-(hydroxymethyl)-N-[(1-hydroxymethyl) propyl] acrylamide; N-(hydroxymethyl)-2-alkyl acrylamides, (e.g., N-(hydroxymethyl)-2-(methyl-heptyl) acrylamide; N-[(1-hydroxymethyl)-1-nonyl]-2-methyl acrylamide; N-(1-hydroxymethyl)-2-methyl acrylamide; N-(hydroxymethyl)-2-propyl acrylamide; etc.) N-(mercaptomethyl) acrylamide; N-methylol-N-isopropyl acrylamide; 3-N-(methylol acrylamido)-3-methyl butyl trimethyl ammonium chloride (cationic); sodium-2-N-methylol acrylamido-2-methyl propane sulfonate (anionic - CH$_2$:C(H)C(:O)N(CH$_2$OH)C[(CH$_3$)$_2$]CH$_2$SO$_3$−Na+), combinations thereof and the like.

Reaction III is suitably connected in the presence of known acid or acid-generating catalysts of sufficient strength to catalyze the condensation reaction. Illustrative catalysts include citric and tartaric acid, ammonium salts such as the ammonium chlorides and phosphates, monoammonium acid phosphate, zinc chloride, etc. In general, the acid or acid generating catalyts permit the condensation reaction to proceed over a broad reaction temperature range (e.g., liquefaction temperature of the solvent system to below decomposition temperature of the reactants). At the lower reaction temperatures (e.g., 40° C. or less), the reaction rate is slow and accordingly reaction temperatures of greater than 50° C. are typically employed. Advantageously the condensation reaction is conducted at temperatures ranging from about 75° C. to about 150° C. At temperatures between about 100° C. to about 125° C. (the preferred range) an acrylamide D.S. level between about 0.03 to about 0.1 can typically be accomplished within a reaction time interval of about 5 to 15 minutes.

Premature polymerization of the acrylamide or starch acrylamide can be effectively avoided by conducting the condensation reaction in the presence of a polymerization inhibitor in an amount sufficient to effectively inhibit the polymerization thereof. Illustrative known polymerization inhibitors, typically used in trace amounts, include hydroquinone and derivatives thereof (e.g., 2,5-di-t-butyl-, 9,10-phenanthio-, 1,4-naphtho-, monoethyl ether of 2,5-dihydroxy-1,4-benzo-, quinones, etc.), 2,4-dinitrochloro- and tri-nitrobenzene, catechol, p-hydroxy-di-phenylamine, N-N$^1$-diphenylphenylene diamine, N-phenyl-beta-naphthylamine, combinations thereof and the like. The water-soluble polyermization inhibitors (e.g., hydroquinone) are preferred.

The starch-acrylamides may be prepared via solution, slurry, dry, semi-dry or other appropriate condensation processes. To prepare a starch-acrylamide having a D.S. level of 0.03 or higher, it is desirable to uniformly disperse the acrylamide, acid or acid generating catalyst and polymerization inhibitor throughout the starch reactant. Uniform dispersal of the N-methylolacrylamide reactant, catalyst and polymerization inhibitor throughout the starch may be effectively accomplished by initially forming a starch slurry or treating the starch with an absorbable dispersant media (e.g., water) in which the acrylamide, catalyst and polymerization inhibitor are soluble or placed in mobile form and thereafter imbibing or absorbing the dispersant and its solutes into the starch granules.

If desired, the starch acrylamides may be prepared via molten, solution or slurry condensation processes (e.g., etherifying) wherein the media may simply serve to control the reaction temperature as solvent media for the reactants, polymerization inhibitor and catalyst system. The most suitable condensation or etherifying media depend largely upon the character of the reactants and the desired end-product. The reactants may be soluble, insoluble, partially or selectively soluble in the liquid etherifying dispersant media. For example, the reactants, polymerization inhibitor and catalyst may be uniformly dispersed throughout the starch and thereafter etherified in a liquid medium in which etherifying components are insoluble. Conversely, the essential etherifying components may be soluble or completely dispersible in the liquid etherification media and etherified therein.

By appropriately balancing the starch and acrylamide reactants to the desired degree of acrylamide substitution (e.g., see Equation III), the reaction may be conducted so as to produce a crude reaction product containing a high starch acrylamide solids level with a relatively low level of unreacted reactants, catalyst, polymerization inhibitor contamination (e.g., less than 15% of total dry solids weight). For certain applications (e.g., (adhesives), the crude reaction product or crude reaction solids (e.g., residue obtained by liquid evaporation) is useful. It is generally desirable, however, to produce a refined starch acrylamide product substantially free of the reaction media impurities (e.g., less than 5% by weight). The processing conditions employed in preparing the starch acrylamide affect the ease of coverting the starch acrylamide to a refined product form.

Many commericial starch products (e.g., low-amylose and the cold-water dispersable starches) absorb a large amount of water before converting to a starch paste. The high-amylose and inhibited starches also absorb water under certain conditions. The catalyst, polymerization inhibitor and acrylamide reactants employed herein are preferably either water-soluble or convertible to a water-dispersible form. Water alone or in combination with other water-dispersible dispersants may be effectively utilized as a means for uniformly dispersing the etherifying reagents throughout the starch reactant for solution, slurry, semi-dry or dry reactions.

The characteristics of the starch reactant have a pronounced affect upon the most suitable reaction conditions, especially when it is desired to produce a refined starch arylamide product. The starch amylose content typically affects the pasting of the starch reactant during its etherification. High-amylose starches (e.g., starches containing more than 50% amylose) characteristically require high pressures and temperatures (e.g., jet cooking at 230° F. or more under steam pressure) for pasting. When cooled (e.g., below 100° C.) the pasted high-amylose starch will typically retrograde into easily recoverable insoluble starch particles. Certain modified and unmodified low-amylose starches retain a granular character in excess water at temperatures below their gelation point (e.g., between 50°–70° C.) but convert into starch pastes when heated above their gelation temperature. In contrast, certain pregelled starches or modified cold-water-swelling granular starches (e.g., hydroxypropylated starches such as disclosed in U.S. Pat. Nos. 3,705,891 and 3,725,386) readily absorb water and swell at temperatures well below 120° F. and often below 75° F. (e.g., 45°–75° F.).

The pasting of starch in an aqueous media creates recovery and refining difficulties. Conventional techniques utilized by the art to prevent starch pasting may be used for this purpose, (e.g., appropriate blending or etherifying conditions). Starch pasting characteristics can be modified or controlled by the appropriate blending and reaction temperatures (e.g., below starch gelation point), appropriate regulation of starch dry solids to water ratio (e.g., sufficient to permit water, catalyst, acrylamide and polymerization inhibitor adsorption into the starch, but insufficient to cause starch gelation), aqueous dispersion time interval, inclusion of starch-swelling-inhibitors, combinations thereof and the like. Certain known starch-swelling-inhibitors (e.g., sodium and potassium chlorides, sodium sulfates, isopropanol, etc.) suppress swelling and pasting and may be used to prevent low pasting starches from converting to a paste form. Due to the high pasting and retrogradation characteristics of high-amylose starches, the high-amylose starches do not generally present starch pasting difficulties.

In order to achieve a homogenous starch acrylamide product, uniform distribution of the essential non-starch reagents throughout the starch reactant is necessary. Uniform distribution of the non-starch reagents throughout the starch reactant may be suitably accomplished by slurrying the starch in a suitable dispersant media containing the essential reaction reagents and homogeneously dispersing these reagents throughout the starch mass. Upon achieving homogeneity, the dispersant (e.g., water) need not be present to complete the reaction.

The most suitable dispersant for achieving homogeneity of the reaction reagents depends largely upon the hydrophilic or hydrophobic properties of the starch and acrylamide reactants. Aqueous systems are generally suitable for uniformly dispersing reactants involving hydrophilic starch and/or hydrophilic acrylamide reactants. Reactants involving both hydrophobic and hydrophilic reactants are more easily converted to a homogeneous reaction mass by combining water and a water-miscible organo dispersent (e.g., alkanols, glycerol, ketones, etc.) within which the hydrophobic reactant will disperse or dissolve. To facilitate the uniform dispersal of hydrophobic reagents and retard starch swelling certain organo dispersants (known to inhibit starch swelling and facilitate the uniform dispersal of hydrophobes into aqueous systems) such as isopropanol, t-butyl alcohol, glycerol, conventional surface active agents or emulsifiers, etc. may likewise be used. Conventional lipophilic or hydrophobic dispersants are typically utilized to uniformly disperse hydrophobic reactants.

Due to refining and recovery difficulties, it is advantageous to prepare the starch acrylamide herein under dry (e.g., about 10% water or less) or semi-dry (at least 25% water) or slurry reaction conditions. The dry reaction proceeds more rapidly to completion. A particularly effective method for preparing a dry or semi-dry solid product is to uniformly disperse the acid or acid generating catalyst, polymerization inhibitor and acrylamide into an aqueous starch slurry or treat the starch therewith. After the catalyst, inhibitor and acrylamide have been absorbed or uniformly dispersed throughout the starch reactant, the water is volatized therefrom (preferably by rapid drying techniques such as by vacuum-, drum-, spray-drying) to provide a semi-dry or dry starch reactant which contains uniformly dispersed or occluded within its solid structure the acrylamide, catalyst and polymerization inhibitor. The resultant dry or semi-dry starch mass can be directly converted to the desired starch acrylamide reaction product by maintaining it at a temperature and for a period of time sufficient to permit the etherification reaction to proceed to the desired D.S. level. Conventional high shear thermal mixing devices (e.g., votators, extruders, Banbury mixers, etc.) may be employed as a dry reactor. The degree of derivatization is dependent upon reaction time and temperature. The reaction proceeds very slowly below 50° C. and more rapidly within the 75° C. to 150° C. range. Typically the derivatization reaction can be completed within about an hour period at a temperature of 100°–125° C. If desired, the reaction temperature and time interval may be used to control the acrylamide derivatization level (e.g., heat for prescribed time interval to achieve desired D.S. level and immediately cool to effectively terminate the reaction).

The crude, dry reaction product may be used directly as a starch coating material or further refined to a starch acrylamide product which is substantially free of by-product impurities. By-product impurities (e.g., acid catalyst, polymerization inhibitor, N-methylolacrylamide, etc.) may be effectively removed therefrom by resuspending or slurrying the dry reaction product in water or other suitable dispersant to extract the by-products therefrom. The resultant starch acrylamide solids may then be partitioned from the aqueous by-product extractant (e.g., by filtration or centrifugation) and suitably washed until the starch acrylamide is essentially free from undesirable by-products. Starch reaction products containing less than 1% by weight unreacted acrylamide, catalyst and polymerization inhibitor (preferably less than 0.1%) are conveniently obtained via the dry reaction process.

The starch acrylamides can be tailor-made to serve a multitude of end uses heretofore not feasible with conventional starch products. The hydrophilic and hydrophobic properties of the starch acrylamide may be varied by appropriate derivatization or starch chain length. The pendant acrylamide sites provide a means for restructuring the starch backbone chains into a high molecular weight product. The acrylamide sites are suitably adapted for conversion into cross-linked or copolymerized starch products which possess atypical starch properties. Cross-linking or copolymerization formulations and processing conditions typically used in the curing or copolymerization of acrylamides may be utilized to convert the starch acrylamides to water-insensitive starch solids.

The starch acrylamide may be made to function as a low-temperature pasting starch in aqueous systems with the added atypical starch characteristic of being convertible into water-insensitive starch-based products. The superior attributes of the present starch acrylamides are well illustrated by their functionality in preparing coated substrates. Desirable aqueous coating application attributes such as high starch solids loading, uniformity in wetting and adhering to a substrate, paste viscosity stability, aqueous dispersion stability against separation and syneresis, low viscosity, etc., may be initially retained during the formulation and application stages of the coating operation. Hydrolysis of the starch chain does not detract from their coating function because starch acrylamides can be converted into a strong, flexible water-insensitive solids by curing or polymerization techniques. The pendant acrylamide sites provide a means for restructuring the hydrolyzed starch chains into a high molecular weight, insoluble starch product. For example, starch acrylamides having a starch chain comparable to a hydrolyzate of a D.E. ranging from about 0.25 to about 32 (e.g., slightly acid or enzymatic thinned starches, dextrins, maltodextrins, etc.) can be effectively used in water-borne coating application at starch solids levels ranging from about 150 to about 1,900 starch acrylamide dry solids for each 100 parts by weight water while still retaining a low, desirable starch paste viscosity (e.g., at 1 to 7,000 cps, Brookfield viscosity, No. 4 spindle at 20° C.).

Comparative to conventional ethylenic unsaturated starches, the present starch acrylamides possess superior polymerization and polymerizate attributes. The juxtapositional

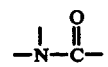

moiety and pendant ethylenically unsaturated group activates the reactivity of the double bond in the presence of free-radical initiating systems. Unlike allyl starches and other similar unsaturated starches, the present water-dispersible acrylamide starches are generally sufficiently stable against intra- and interpolymerization and may be conveniently stored under normal ambient temperatures. Under free-radical initiating polymerization conditions (e.g., thermal or irradiation induction), the starch acrylamides interpolymerize to form starch interpolymerizates containing recurring interpolymerized units represented by the structure:

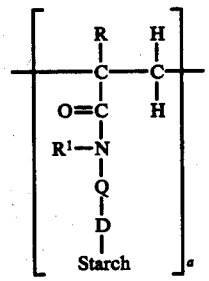

wherein "R", "R¹", "Q", "D" and "a" are as defined herein. Most typically the individual appendant acrylamide groups will have a molecular weight of less than 400 and most usually between about 100 to about 200. In general a greater number of different starch chains are interpolymerized and linked together via interpolymerized acrylamide (including other ethylenically unsaturated monomers when present in the interpolymerizate reaction) as "a" or the acrylamide D.S. level increases. In the interpolymerized form, the acrylamide groups function as an internally polymerized plasticizer for the interpolymerizate product (e.g., disrupt starch intra- and interhydrogen bonding effect and crystalline starch). The degree of interpolymerized acrylamide units in the interpolymerizate is controllable by the D.S. of the starch acrylamide.

As the acrylamide D.S. increases above 1.0, the starch acrylamides herein tend to form interpolymerizates of a more rigid and brittle structure. Interpolymerization brittleness at these elevated acrylamide D.S. levels, however, can be reduced by the characteristics and composition of the acrylamide moieties. For certain applications, a rigid and brittle starch interpolymerizate is often desirable. As a general rule, more flexible interpolymerizates are achieved as the acrylamide D.S. level decreases below the 0.5 level. Moreover, the lower acrylamide D.S. levels (e.g., about 0.01 to about 0.2) reduce the starch acrylamide raw material costs while still affording a sufficient quantity of polymerizable acrylamide units to permit the unpolymerized, water-dispersible, starch acrylamide to convert to a water-indispersible form. Dried films or shaped objects obtained from unpolymerized starch acrylamides typically redisperse into an aqueous dispersant media (e.g., water or water-methanol). Centrifugation of these unpolymerized starch acrylamides at a centrifugal force of 1000 g's for 60 minutes typically results in substantially lesser (e.g., at least two fold) amount of centrifugal residue than those arising from centrifugation of the interpolymerized starch acrylamides. In contrast to allyl starches, the interpolymerization of the low D.S. starch acrylamides herein is more controllable (e.g., under free-radical induction) and normally yields a more uniform interpolymerizable product without excessive starch chain intrapolymerization. Starch acrylamides of a D.S. ranging from about 0.005 to about 0.1 are particularly well adapted for use in achieving flexible, interpolymerizates for coating applications.

The ability to use these starch acrylamides at a low pasting viscosity and high solids level makes the starch acrylamides herein particularly well suited for high-speed thermal or irradiation curing processes and apparatus. Dried or wet starch acrylamide coating which contain uniformly dispersed therein polymerizable ethylenic unsaturated monomers, a free-radical catalyst (e.g., hydrogen peroxide) or alternatively photoinitiators such as benzophenones can be converted into flexible, relatively clear interpolymerizate coatings via ultra-violet or thermal curing techniques. The hydrophilic starch acrylamides (i.e., those dispersible in water) can be effectively used for coating applications relying upon a water as the sole liquid dispersant vehicle. The starch acrylamides may be used to protectively coat a wide variety of substrates such as textiles, papers, synthetic natural polymers, metals, wood, etc. Starch acrylamide coatings or shaped objects which possess excellent tensile strength and elongation properties; flexibility, dynamic peel and impact strength, water and detergent resistance and improved resistance toward bacteriological and enzymatic degradation may be obtained by interpolymerizing the starch acrylamide with other concomitant ethylenically unsaturated monomers (e.g., acrylates, acrylics, acrylamides, etc.) and conventional cross-linking reagents in the presence of free-radical catalysts or initiators by conventional thermally or irradiation induced free-radical polymerization techniques. Conventional free-radical polymerization initiators such as the organic and inorganic peroxides (e.g., hydrogen peroxide, cumene hydroperoxide, caproyl peroxide), persulfates (e.g., ammonium, sodium or potassium persulfate), oxidation-reduction initiator systems (e.g., sodium bisulfite, thiosulfates, sulfites in combination with persulfates or peroxides, etc.) azo initiators (e.g., azo di-isobutyronitrile), and other free-radical generating catalyst systems at levels (e.g., about 0.25% to about 3%) sufficient to initiate its interpolymerization may be incorporated into the starch acrylamides to provide an interpolymerizable starch acrylamide product. Homogeneous admixtures of the starch acrylamide with a polymerization initiator system provides a latently polymerizable starch product. The unpolymerizable starch-free radical system may be conveniently preformed into the appropriate shape or form. The preformed unpolymerized starch product may be easily converted to the desired interpolymerizate product by initiating the polymerization catalyst system to generate free radicals (e.g., thermal, irradiation, etc. induction) and thereby cause interpolymerization of the starch acrylamide moieties.

The following examples are merely illustrative and should not be construed as limiting the scope of the invention.

EXAMPLE I

A starch acrylamide was prepared by etherifying a low viscosity, acid-thinned granular waxy maize starch[1] with N-methylol acrylamide in the presence of an acid catalyst (ammonium dihydrogen orthophosphate) and a polymerization inhibitor (hydroquinone). A starch reaction system (at 23° C.) was prepared by adding 505 ml. solution of ammonium dihydrogen orthophosphate (0.141 kg adjusted to pH 4.6 with ammonium hydroxide) to 1.8 liters of distilled water, followed by the addition thereto of 0.272 kg of N-methylolacrylamide (as 40% water — 60% N-methylolacrylamide solution) and 0.25 grams of hydroquinone. Uniform distribution of the N-methylolacrylamide, catalyst and polymerization inhibitor throughout the waxy maize starch granules reactant was then accomplished by slowly adding 2.82 kg. of the waxy maize starch reactant (2.5 kg dry starch) with manual stirring until a starch dough consistency was achieved. The starch dough (containing the absorbed water and N-methylolacrylamide, catalyst and polymerization inhibitor solutes) was then uniformly and equally spread onto two stainless steel trays (12 ¾ inches × 16 ¾ inches) and allowed to dry therein at room temperature (e.g., 23° C., facilitated by periodic crushing and granulation of the friable mass into smaller particle size). After the water content of the starch mass had been reduced to 20% (total weight basis), the dried mass was transferred to a high velocity forced air oven maintained at 125° C. After 65 minutes in the oven, the crude starch acrylamide reaction product was removed from the oven, uniformly suspended in six liters of distilled water by manual mixing and then filtered on a Lapp filter. The starch acrylamide filter cake was washed with distilled water until free of ammonium dihydrogen orthophosphate (molybate test) and then vacuum filtered to remove excess water therefrom. A dry starch acrylamide was obtained therefrom by drying the crushed filter cake in a forced air oven at 55° C. (approximately 12 hours).

[1] - STA-TAPE 100 — manufactured by the A. E. Staley Manufacturing Company - A low viscosity, acid-thinned, granular waxy maize starch (100% amylopectin) typically characterized as having a Brookfield viscosity of about 500 CPS (#2 spindle, 20 rpm, 150° C. at a dry solids of 40–45%) and a D.E. of less than 1%.

A total of 2.64 kg. of the dry starch acrylamide product was recovered. The starch acrylamide D.S. was 0.092 (0.76% N assay).

EXAMPLE II

A low viscosity, starch acrylamide product was prepared in accordance with Example I, employing the following portions of reagents (parts by weight basis):

- 115 STA-TAPE 100 Starch[2] (100 parts by weight dry starch basis)
- 12.5 N-methylolacrylamide (as 60% aqueous soln.)
- 3.0 ammonium chloride (acid catalyst)
- 0.0063 methyl hydroquinone (polymerization inhibitor)
- 115 water.

The aforementioned reagents were uniformly blended to a stiff dough consistency, then spread onto a stainless steel tray and allowed to air-dry at ambient temperature (23° C.) to a semi-dried product of 24.6% water content (total weight basis). The resultant unreacted product was then converted to a starch acrylamide by placing 22.5 parts by weight of the unreacted semi-dry blend into a 125° C. forced air oven for 45 minutes followed by immediately cooling of the resultant reaction product for purposes of effectively terminating the condensation reaction. The resultant crude starch acrylamide reaction product was converted to a refined starch acylamide by slurrying in water, filtering and washing the filtered residue with water followed by a methanol wash. The resultant refined starch acrylamide was air-dried to 5% moisture level under ambient conditions. The acrylamide D.S. of the resultant starch acrylamide was 0.15 (as determined by nitrogen analysis - 1.2% starch acrylamide nitrogen content).

2 - see Footnote 1

The effect of starch acrylamide interpolymerization was studied. A portion of the original starch acrylamide (0.53g) was uniformly pasted in 5.5 milliliters of 95° C. water, cooled to 23° C., whereupon 5 milligrams of potassium persulfate polymerization catalyst (0.5% persulfate in water solution) was uniformly dispersed by manual mixing into the cooled starch acrylamide paste. Without adding potassium persulfate catalyst, a control 0.3 grams starch acrylamide sample was uniformly pasted in 3.1 milliliters 95° C. water, and cooled to 23° C. The persulfate containing sample and the control sample were then uniformly layered (at about 30 mil thickness) onto a stainless steel tray and heated for 45 minutes at 80° C. Both the unpolymerized control and polymerized starch acrylamide formed clear films. Each of the resultant films was weighed to a 0.2 gram test sample and then immersed for 60 minutes in 20 milliliters water at 75° C. The unpolymerized control film disintegrated and the interpolymerized starch acrylamide film swelled. The amount of soluble and insoluble starch acrylamides for each immersion was then determined by centrifuging the immersions at $10^3$ g's centrifugal force for 10 minutes. The unpolymerized starch acrylamide yielded 79% by weight soluble starch acrylamide and a 21% centrifugal residue. The interpolymerized starch acrylamide film was significantly more resistant to redispersion in water under the aforementioned immersion test conditions (more than 15 times). The centrifugal residue from the immersed interpolymerized starch acrylamide film was 95% of the total starch acrylamide starch weight with the balance being in the water-soluble starch acrylamide form. The high centrifugal residue for the starch acrylamide interpolymerizable film was attributable to the interpolymerization of the ethylenically unsaturated starch units to a high molecular weight starch interpolymerizate product. The essentially watersoluble starch acrylamide paste was effectively converted to a starch interpolymerizate having a 20 fold decrease in water-dispersibility properties. In contrast, the unpolymerized starch acrylamide film was similar to the starting starch acrylamide paste and essentially retained its water-dispersibility properties.

EXAMPLE III

This example illustrates the relationship between time and temperature in preparing starch acrylamides with varying D.S. levels under dry reaction conditions. Spray-dried particles consisting of a dry homogeneous mass of starch, N-methylol acrylamide, acid catalyst and polymerization inhibitor were prepared from starch slurries consisting of the following reagents:

|  | Waxy Maize Starch | STA-TAPE 100 Starch |
| --- | --- | --- |
| Starch (dry basis) | 3450 | 3370 |
| N-Methylolacrylamide (dry basis) | 624 | 624 |
| Monoammonium Phosphate | 878 | 878 |
| Methylhydroquinone | 0.6 | 0.6 |
| Water (23° C.) | 9052 | 9055 |

The slurries were prepared by charging the designated amounts of water to a mixing vessel, adding the monoammonium phosphate thereto, adjusting to a pH 4.6–4.7 (sodium hydroxide or sulfuric acid), followed by the methylhydroquinone (as 0.004% by weight water solution at 40° C.) addition and then slowly adding the designated amount of starch with moderate mixing for one hour. The resultant starch slurries were then spray dried under the following conditions:

|  | Waxy Maize Starch | STA-TAPE 100 Starch |
| --- | --- | --- |
| Air, ft³/min. | 6.0–6.4 | 6.0–6.5 |
| Temp. ° F., inlet | 265–275 | 260 |
| Av. Drying Loss, % | 6 | 6 |
| Time, Hr./gal. | 2 | 1.5 |

The spray-dried products were stored under ambient conditions (23° C.) for several months with periodic nitrogen analysis to ascertain the starch acrylamide D.S. The nitrogen assays were conducted upon spray-dried particles which had been purified in accordance with the Example I refining method. The following Table 1 records the starch acrylamide D.S. levels obtained at varying time intervals under the ambient dry reaction conditions.

TABLE 1

| Waxy Maize Starch | | | | STA-TAPE 100 Starch | | | |
| --- | --- | --- | --- | --- | --- | --- | --- |
| Time, days | %N (dry basis) | Corrected | D.S. | Time, days | %N (dry basis) | Corrected | D.S. |
| 0 | 0.05* | 0.02 | 0.023 | 0 | 0.006* | 0.03 | 0.0035 |
| 14 | 0.18 | 0.15 | 0.0175 | 10 | 0.16 | 0.13 | 0.015 |
| 49 | 0.36 | 0.33 | 0.039 | 45 | 0.45 | 0.42 | 0.05 |
| 109 | 0.48 | 0.45 | 0.0535 | 105 | 0.65 | 0.62 | 0.074 |

*Nitrogen in untreated starch is 0.03

All the Table 1 starch acrylamides will paste in water to give homogeneous solutions indicating negligible, if any crosslinking. As illustrated by the Table 1 data, the starch acrylamide derivatization reaction proceeds slowly at ambient temperature. At reaction temperatures ranging from 55°–65° C. no detectable derivatization is observed over a 2 hour reaction time while measurable but nominal derivatization occurs when the dry reaction is conducted at 75° C. for 2 hours.

Portions of the aforementioned spray-dried starch particles were dry reacted at temperatures of 105° C., 125° C., and 150° C. Termination of the dry reaction at the designated time intervals of Table 2 was accomplished by immediate cooling of the reaction mass to a temperature below 23° C. Nitrogen assays were conducted upon the starch acrylamides in which the unreacted contaminants were removed by the Example I refining methodology. The results of these elevated dry reactions at the designated reaction times and temperatures are recorded in Table 2.

TABLE 2

| Temp. °C. | Time (Min.) | Waxy Maize Starch %N | Waxy Maize Starch D.S. | STA-TAPE 100 Starch %N | STA-TAPE 100 Starch D.S. |
|---|---|---|---|---|---|
| 105 | 16 | 0.50 | 0.06 | 0.41 | 0.049 |
| 105 | 42 | | | 1.08 | 0.13 |
| 125 | 16 | 0.93 | 0.113 | 0.98 | 0.12 |
| 150 | 5 | 0.89 | 0.108 | 0.73 | 0.088 |

As illustrated by the Table 2 data, both the reaction time and temperature affect the degree of starch acrylamide derivatization. If desired, the starch acrylamide D.S. level may be effectively controlled by permitting the dry reaction to proceed for a period of time sufficient to yield the desired D.S. level at any given temperature. As evident by a comparison between the Table 1 and Table 2 data, the dry reaction proceeds more quickly to completion at temperatures above 100° C. The aforementioned starch acrylamides (crude or refined) may be homopolymerized or copolymerized with other ethylenically unsaturated monomers via free-radical initiation to provide interpolymerizates containing recurring and interpolymerized starch acrylamide moieties. The degree of swelling of the starch acrylamide interpolymerizates in water (at 75° C.) decreases as the D.S. level increases. The higher D.S. starch acrylamide interpolymerizates (e.g., above a 0.05 D.S.) are more resistant to swelling in water than those of a lower D.S. value. Starch acrylamide interpolymerizates which have a starch acrylamide D.S. of 0.03 or higher will typically yield less than 20% soluble when subjected to the immersion and centrifugation test of Example II as opposed to the unpolymerized starch acrylamides thereof which typically exhibit essentially complete dissolution in water at temperatures in excess of their gelation point.

EXAMPLE IV

Starch acrylamides respectively having a D.S. 0.085 and 0.07 were prepared according to Example I. The reagents consisting of 2820 grams STA-TAPE 100 (2500 gms dry starch), 271.8 grams N-methylolacrylamide (60% aqueous solution), 141 grams monoammonium phosphate (acid catalyst), 0.25 grams hydroquinone (polymerization inhibitor) and 2320 grams water were uniformly blended to a dough consistency and dried under ambient conditions to a 10% moisture level (i.e., 90% dry solids). The resultant dry blend was oven reacted in an oven at 125° C. for a period of time sufficient to provide 0.085 D.S. starch acrylamide and 0.07 D.S. starch acrylamide. The unreacted methylolacrylamide, inhibitor and catalyst contaminants were removed by refining the crude starch acrylamide according to the refining method of Example II.

A photosensitive starch acrylamide was prepared by adding a 0.5 ml. water solution containing 40 mg sodium-2-benzoylbenzoate and 30 mg. triethanol amine to 4.86 grams of the 0.085 D.S. starch acrylamide which had been pasted in a sufficient amount of water to yield a 30% (dry solids) starch acrylamide paste. The fluid, photosensitive starch paste was uniformly spread onto a glass plate and irradiated with a sun lamp positioned 6 inches above the glass plate. After 20 seconds irradiation, the starch acrylamide had polymerized sufficiently to form a non-flowable gel. The ultra-violet irradiation was continued for an additional 100 seconds. The photoinitiated and interpolymerized starch film coating was then placed in a 100° C. oven for purposes of drying the film. Based on total starch film weight, the interpolymerizate film yielded an 89% centrifugation residue (i.e., insolubles) when tested according to Example II immersion and centrifugation test.

A 10 gram sample of the 0.07 D.S. starch acrylamide was pasted in water (30% starch solids) and uniformly admixed with 1 ml. of methylene blue solution (0.0032g/50 ml.) and 0.006 ml. of sodium bicarbonate-p-toluene sulfinic acid solution (1.68 g and 2.14 g respectively in 50 ml. of water). The solution was spread into a beaker and placed upon a window-well with a southern sunlight exposure. The starch solution gelled within 30 minutes. After 72 hours exposure, seventy-eight percent starch acrylamide insolubilization was effected by interpolymerization of the starch acrylamide.

In a similar manner, a potassium persulfate polymerizable starch acrylamide (D.S. 0.03) was prepared by adding a catalytic amount of potassium persulfate to an acrylamidomethyl starch paste (8% starch acrylamide solids). A portion of the resultant solution was dried for 16 hours at 100° C. while the other portion was allowed to dry at ambient temperature. Pursuant to the immersion and centrifugation test, the centrifugation residue for the 100° C. dried film was 88% insolubles while the ambient dried film yielded 27% insolubles. This test was repeated with 0.142 D.S. starch acrylamide with the 100° C. dried films yielding 95.5% insolubles and the room-temperature dried films yielding 90% insolubles. The significantly higher percentage of insolubles for the 0.142 D.S. starch acrylamide comparative to the 0.03 starch is attributable to the fact the higher D.S. starch contains more polymerizable ethylenic unsaturation. Accordingly the 0.142 D.S. starch under ambient polymerization conditions yielded a more highly crosslinked starch than was achieved via the 0.03 D.S. starch.

Since many embodiments of this invention may be made and since many changes may be made in the embodiments described, the foregoing is interpreted as illustrative and the invention is defined by the claims appended hereafter.

What is claimed is:

1. A starch acrylamide suitable for use in preparing starch polymerizates which contain recurring and interpolymerized starch acrylamide units, said starch acrylamide comprising a starch chain and appendant acrylamide groups contiguously attached to said starch chain with said appendant group being characterized as containing terminal

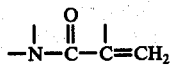

moieties.

2. The starch acrylamide according to claim 2 wherein the starch chain is characterized as containing an average of at least one appendant acrylamide group for each 1000 D-glucose units of said starch chain.

3. The starch acrylamide according to claim 2 wherein the appendant acrylamide group has a molecular weight of less than 400.

4. The starch acrylamide according to claim 2 wherein the starch acrylamide is characterized as being dispersible in water.

5. The starch acrylamide according to claim 4 wherein the acrylamide D.S. ranges from about 0.03 to about 0.2 and the individual appendant acrylamide groups have an average molecular weight ranging from about 100 to about 200.

6. The starch acrylamide according to claim 1 wherein said starch acrylamide comprises a starch acrylamide represented by the formula:

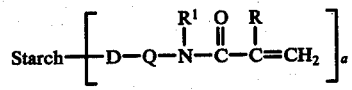

wherein starch represents a starch chain, $R^1$ is a member selected from the group consisting of hydrogen and a monoorgano group joined directly to the nitrogen atom by a monovalent bond, R represents a member selected from the group consisting of hydrogen and monoorgano group linked to alpha carbon atom of the ethylenically unsaturated group by a monovalent linkage, Q represents an organo group which divalently joins the D group with the acrylamide group; D is a member selected from the group consisting of sulfur and oxygen, and "a" represents the number of acrylamide substituents per anhydroglucose unit of said starch molecule.

7. The starch acrylamide according to claim 7 wherein D is an oxy group, Q is an alkylene moiety linking the starch D group with the nitrogen atom of said acrylamide group and "a" represents a D.S. of at least 0.0005.

8. The starch acrylamide according to claim 6 wherein D is an oxy group, R and $R^1$ are members selected from the group consisting of hydrogen and a monoorgano group containing less than 8 carbon atoms.

9. The starch acrylamide according to claim 8 wherein R is a member selected from the group consisting of hydrogen and methyl, $R^1$ is hydrogen and "a" represents a D.S. ranging from about 0.03 to about 0.5.

10. The starch acrylamide according to claim 1 wherein said starch acrylamide consists essentially of a starch acrylamide represented by the structural formula:

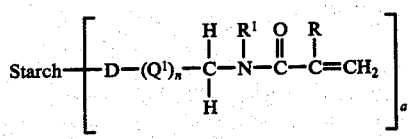

wherein starch represents a starch chain, $R^1$ is a member selected from the group consisting of hydrogen and a monoorgano group joined directly to the nitrogen atom by a monovalent bond, R represents a member selected from the group consisting of hydrogen and monoorgano group linked to alpha carbon atom of the ethylenically unsaturated group by a monovalent linkage, $Q^1$ represents an organo group which divalently joins the D group with the acrylamide group; D is a member selected from the group consisting of sulfur and oxygen with D linking said $Q^1$ group to the starch chain, "a" represents the number of acrylamide substituents per anhydroglucose unit of said starch molecule and "n" is an integer of 0 to 1.

11. The starch acrylamide according to claim 10 wherein "n" is zero and "a" represents a D.S. of at least 0.001.

12. The starch acrylamide according to claim 10 wherein D is an oxy group, R is a member selected from the group consisting of hydrogen and a lower alkyl and $R^1$ is hydrogen.

13. The starch acrylamide according to claim 12 wherein "a" represents a D.S. ranging from about 0.003 to about 0.2.

14. The starch acrylamide according to claim 13 wherein the starch chain consists essentially of a starch hydrolyzate.

15. The starch acrylamide according to claim 10 wherein the starch arylamide is characterized as forming a flowable starch acrylamide paste when one part by weight starch acrylamide is admixed with 100 parts by weight water at 95° C.

16. The starch acrylamide according to claim 15 wherein "n" is zero, D is an oxy group, $R^1$ is hydrogen and R is a member selected from the group consisting of hydrogen and methyl and "a" represents a D.S. of at least 0.003.

17. The starch acrylamide according to claim 16 wherein said starch acrylamide is pasted in a sufficient amount of water to provide a homogeneous starch acrylamide paste thereof.

18. A method for preparing a starch acrylamide characterized as containing terminal

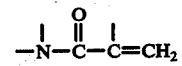

moieties, said method comprising reacting a starch which contains reactive hydrogen atoms with an N-methylol reactant wherein the N-methylol reactant is characterized as containing a

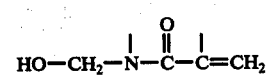

grouping, with the reaction being conducted in the presence of an acid catalyst in an amount sufficient to catalyze the condensation reaction between the starch and the N-methylol reactant.

19. The method according to claim 18 wherein the reaction is conducted in the presence of a polymerization inhibitor in an amount sufficient to inhibit the polymerization of said starch acrylamide.

20. The method according to claim 19 wherein the condensation reaction is conducted at a temperature greater than 50° C.

21. The method according to claim 20 wherein the reaction is conducted in the presence of a sufficient amount of N-methylol reactant and for a period of time sufficient to provide a starch acrylamide having an acrylamide D.S. of at least 0.03.

22. The method according to claim 21 wherein a homogeneous blend of the starch, the catalyst, polymerization inhibitor and N-methylol reactant is dry reacted at a temperature ranging from about 75° C. to about 150° C.

23. The method according to claim 22 wherein contaminants are removed from the dry reacted starch acrylamide.

24. The method according to claim 19 wherein the starch is etherified with a N-methylol reactant represented by the formula:

wherein R¹ is a member selected from the group consisting of hydrogen and a monovalent organo moiety, and R is a member selected from the group consisting of hydrogen and a monovalent organo moiety.

25. The method according to claim 24 wherein the etherification reaction is conducted under reaction conditions sufficient to provide a starch acrylamide having a D.S. ranging from about 0.005 to about 2.0.

26. The method according to claim 24 wherein the reaction is conducted in the presence of an acid catalyst in an amount sufficient to catalyze the etherification reaction between the starch and the N-methylol reactant.

27. The method according to claim 26 wherein a homogenous blend of the starch, N-methylol reactant, polymerization inhibitor and acid catalyst is dry reacted at a temperature ranging from about 75° C. to about 150° C.

28. The method according to claim 27 wherein R is a member selected from the group consisting of hydrogen and methyl and R¹ is hydrogen.

29. The method according to claim 28 wherein the starch reacted with the methylol reactants is characterized as forming a homogeneous starch paste when one part by weight of the starch is admixed with 100 parts by weight water at 95° C.

30. The method according to claim 29 wherein the starch comprises a starch hydrolyzate and the dry reaction is conducted under etherification conditions sufficient to provide a starch acrylamide having an acrylamide D.S. within the range of about 0.03 to about 0.2.

31. In a method for polymerizing an ethylenically unsaturated starch derivative in the presence of a polymerization initiator, the improvement which comprises interpolymerizing a starch acrylamide wherein the starch acrylamide is characterized as comprising a starch chain and appendant acrylamide groups contiguously attached to said chain with the appendant groups being characterized as containing terminal

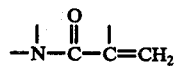

moieties.

32. The method according to claim 31 wherein the acrylamide D.S. of said starch acrylamide ranges from about 0.03 to about 1 and the average molecular weight of the appendant acrylamide groups is less than 400.

33. The method according to claim 31 wherein said starch acrylamide comprises a starch acrylamide represented by the formula:

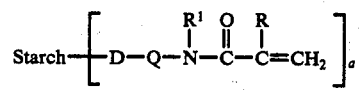

wherein starch represents a starch chain, R¹ is a member selected from the group consisting of hydrogen and a monoorgano group linked to the nitrogen atom by a monovalent carbon linkage, R represents a member selected from the group consisting of hydrogen and monoorgano group linked to the alpha carbon atom of the ethylenically unsaturated group by a monovalent carbon linkage, Q represents an organo group which divalently links the D group to the acrylamide group; D is a member selected from the group consisting of sulfur and oxygen, and "a" represents the number of acrylamide substituents per anhydroglucose unit of said starch molecule.

34. The method according to claim 33 wherein R is a member selected from the group consisting of hydrogen and methyl, D is an oxy group and R¹ is hydrogen and "a" represents a D.S. ranging from about 0.03 to about 0.5.

35. The method according to claim 34 wherein Q is a methylene group.

36. The method according to claim 35 wherein the starch acrylamide is characterized as forming a homogeneous starch paste when one part of the starch acrylamide is admixed with 100 parts by weight water at 95° C.

37. A polymerized starch acrylamide composition comprising recurring and interpolymerized starch acrylamide units represented by the sturcture:

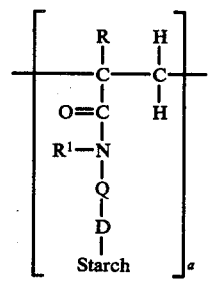

wherein starch represents a starch chain, R¹ is a member selected from the group consisting of hydrogen and a monoorgano group, R represents a member selected from the group consisting of hydrogen and a monoorgano group, Q represents an organo group which divalently links the D group with the nitrogen atom; D is a member selected from the group consisting of sulfur and oxygen, and "a" represents the number of interpolymerized acrylamide substituents per anhydroglucose unit of said starch chain.

38. The polymerized starch acrylamide composition according to claim 37 wherein the composition is characterized as yielding a centrifugal residue of at least about 80% of the total polymerized starch composition acrylamide weight when one part by weight of the polymerized starch acrylamide composition is immersed in 100 parts by weight water at 75° C. for 60 minutes and the immersed polymerized starch acrylamide and water is then subjected to a centrifugal force of 1000 g's for 10 minutes.

39. The polymerized starch acrylamide composition according to claim 37 wherein "a" ranges from about 0.003 to about 1.0 and D is an oxy group.

40. The polymerized starch acrylamide composition according to claim 38 wherein D is an oxy group, and Q is linked to the nitrogen atom by a methylene moiety, R is a member selected from the group consisting of hydrogen and a lower alkyl, $R^1$ is a member selected from the group consisting of hydrogen and lower alkyl, and "a" ranges from about 0.003 to about 0.5.

41. The polymerized starch acrylamide composition according to claim 38 wherein R is a member selected from the group consisting of hydrogen and methyl, $R^1$ is hydrogen, Q is methylene, D is oxy and "a" ranges from about 0.05 to about 0.2.

* * * * *

UNITED STATES PATENT AND TRADEMARK OFFICE
CERTIFICATE OF CORRECTION

PATENT NO. : 4,060,506
DATED : Nov. 29, 1977
INVENTOR(S) : Frank Verbanac

It is certified that error appears in the above-identified patent and that said Letters Patent are hereby corrected as shown below:

Column 4, bridging lines 49 and 50; for "$-(CH_2-C(CH_3)H-C)-_{n1}(CH_2C(CH_3)H-O-$"
read --- $-(CH_2-C(CH_3)H-O)-_{n1}-CH_2C(CH_3)H-O-$ ---

Column 5, bridging lines 62 and 63; for "3(N-methylol acyrlamido)-3-methyl butyl" read --- 3-(N-methylol acrylamido)-3-methyl butyl---
Column 6, line 27; for "connected" read ---conducted---
Column 7, line 12; for "temperature as" read ---temperature or as---
Column 7, line 59; for "arylamide" read ---acrylamide---
Column 11, line 49; for "upon a water" read ---upon water---
Column 14, line 2; for "watersoluble" read ---water-soluble---

UNITED STATES PATENT AND TRADEMARK OFFICE
CERTIFICATE OF CORRECTION

PATENT NO. : 4,060,506
DATED : Nov. 29, 1977
INVENTOR(S) : Frank Verbanac

It is certified that error appears in the above-identified patent and that said Letters Patent are hereby corrected as shown below:

Column 2, line 65; for "derivativing" read ---derivatizing---
Column 12, footnote 1, line 4; for "150°C." read ---150°F.---
Column 17, line 6; for "according to claim 2" read ---according to claim 1---
Column 17, line 42; for "according to claim 7" read ---according to claim 6---

Signed and Sealed this

Twenty-ninth Day of May 1979

[SEAL]

Attest:

RUTH C. MASON
Attesting Officer

DONALD W. BANNER
Commissioner of Patents and Trademarks